(12) United States Patent
Coman et al.

(10) Patent No.: US 8,800,685 B2
(45) Date of Patent: Aug. 12, 2014

(54) DRILL-BIT SEISMIC WITH DOWNHOLE SENSORS

(75) Inventors: Radu Coman, Hannover (DE); Sunil Kumar, Celle (DE)

(73) Assignee: Baker Hughes Incorporated, Houston, TX (US)

(*) Notice: Subject to any disclaimer, the term of this patent is extended or adjusted under 35 U.S.C. 154(b) by 319 days.

(21) Appl. No.: 13/219,958

(22) Filed: Aug. 29, 2011

(65) Prior Publication Data
US 2012/0103688 A1 May 3, 2012

Related U.S. Application Data

(63) Continuation-in-part of application No. 13/093,326, filed on Apr. 25, 2011, now Pat. No. 8,695,729, and a continuation-in-part of application No. 13/093,289, filed on Apr. 25, 2011.

(60) Provisional application No. 61/408,106, filed on Oct. 29, 2010, provisional application No. 61/408,144, filed on Oct. 29, 2010, provisional application No. 61/408,119, filed on Oct. 29, 2010.

(51) Int. Cl.
*E21B 47/14* (2006.01)
*E21B 49/00* (2006.01)

(52) U.S. Cl.
USPC ............................................. 175/50; 175/428

(58) Field of Classification Search
USPC .............. 175/50, 428, 39, 327, 374, 433, 432
See application file for complete search history.

(56) References Cited

U.S. PATENT DOCUMENTS

| | | |
|---|---|---|
| 4,645,977 A | 2/1987 | Kurokawa et al. |
| 4,707,384 A | 11/1987 | Schachner et al. |
| 4,849,945 A | 7/1989 | Widrow |
| 4,862,423 A | 8/1989 | Rector |
| 4,926,391 A | 5/1990 | Rector et al. |
| 4,954,998 A | 9/1990 | Rector |
| 4,964,087 A | 10/1990 | Widrow |
| 4,965,774 A | 10/1990 | Ng et al. |

(Continued)

FOREIGN PATENT DOCUMENTS

JP    2000225511 A    8/2000

OTHER PUBLICATIONS

Battaglia, J. et al., "Estimation of Heat Fluxes During High-Speed Drilling," Int. Jnl. Adv. Manf. Technol., vol. 26, pp. 750-758(2005).

(Continued)

*Primary Examiner* — Jennifer H Gay
(74) *Attorney, Agent, or Firm* — Mossman Kumar & Tyler PC

(57) ABSTRACT

A drill-bit seismic method where the seismic receivers are located in the BHA. The data detected by these receivers is processed by a downhole processing unit in order to estimate the interval velocity of the seismic wave between the sensors and between the bit and a sensor. Additionally, the processed data might provide the distance to a seismic reflector close to the borehole and the average seismic velocity between the well and this reflector. The processed data can be transmitted to surface location by mud-pulse telemetry. The pilot signal can be also used to process seismic data recorded by receivers located at the earth surface (or close to it).

20 Claims, 8 Drawing Sheets

(56) References Cited

U.S. PATENT DOCUMENTS

| | | | |
|---|---|---|---|
| 4,976,324 A | 12/1990 | Tibbitts | |
| 5,012,453 A | 4/1991 | Katz | |
| 5,066,938 A | 11/1991 | Kobashi et al. | |
| 5,109,947 A | 5/1992 | Rector, III | |
| 5,144,591 A * | 9/1992 | Hardage | 367/75 |
| 5,317,302 A | 5/1994 | Yamazaki | |
| 5,337,844 A | 8/1994 | Tibbitts | |
| 5,372,207 A | 12/1994 | Naville et al. | |
| 5,438,860 A | 8/1995 | Kawai et al. | |
| 5,467,320 A | 11/1995 | Maki, Jr. | |
| 5,511,038 A | 4/1996 | Angeleri et al. | |
| 5,512,873 A | 4/1996 | Saito et al. | |
| 5,523,121 A | 6/1996 | Anthony et al. | |
| 5,585,556 A | 12/1996 | Petersen et al. | |
| 5,706,906 A | 1/1998 | Jurewicz et al. | |
| 5,881,830 A | 3/1999 | Cooley | |
| 5,924,499 A * | 7/1999 | Birchak et al. | 175/40 |
| 6,068,070 A | 5/2000 | Scott | |
| 6,078,868 A | 6/2000 | Dubinsky | |
| 6,151,554 A * | 11/2000 | Rodney | 702/9 |
| 6,193,001 B1 * | 2/2001 | Eyre et al. | 175/432 |
| 6,262,941 B1 | 7/2001 | Naville | |
| 6,274,403 B1 | 8/2001 | Klages et al. | |
| 6,540,033 B1 * | 4/2003 | Sullivan et al. | 175/40 |
| 6,564,883 B2 | 5/2003 | Fredericks et al. | 175/50 |
| 6,571,886 B1 * | 6/2003 | Sullivan et al. | 175/40 |
| 6,626,251 B1 * | 9/2003 | Sullivan et al. | 175/40 |
| 6,892,836 B1 * | 5/2005 | Eyre et al. | 175/432 |
| 7,168,506 B2 * | 1/2007 | Boucher et al. | 175/48 |
| 7,338,202 B1 | 3/2008 | Kapat et al. | |
| 7,350,568 B2 * | 4/2008 | Mandal et al. | 166/254.2 |
| 7,398,837 B2 * | 7/2008 | Hall et al. | 175/50 |
| 7,451,838 B2 * | 11/2008 | Keshavan | 175/374 |
| 7,697,375 B2 | 4/2010 | Reiderman et al. | |
| 7,730,967 B2 | 6/2010 | Ballantyne et al. | |
| 7,946,357 B2 * | 5/2011 | Trinh et al. | 175/50 |
| 8,122,980 B2 * | 2/2012 | Hall et al. | 175/432 |
| 8,210,280 B2 * | 7/2012 | Trinh et al. | 175/41 |
| 8,215,384 B2 * | 7/2012 | Trinh et al. | 166/177.1 |
| 8,250,786 B2 * | 8/2012 | Hall et al. | 37/465 |
| 8,316,964 B2 * | 11/2012 | Hall et al. | 175/40 |
| 2003/0192721 A1 * | 10/2003 | Singh et al. | 175/341 |
| 2004/0011567 A1 * | 1/2004 | Singh et al. | 175/341 |
| 2004/0240320 A1 | 12/2004 | McDonald et al. | |
| 2005/0067191 A1 * | 3/2005 | Miyamoto et al. | 175/50 |
| 2005/0230149 A1 | 10/2005 | Boucher et al. | |
| 2005/0279532 A1 * | 12/2005 | Ballantyne et al. | 175/40 |
| 2006/0018360 A1 | 1/2006 | Tai et al. | |
| 2006/0065395 A1 * | 3/2006 | Snell | 166/255.2 |
| 2006/0175057 A1 * | 8/2006 | Mandal et al. | 166/254.2 |
| 2007/0029116 A1 * | 2/2007 | Keshavan | 175/428 |
| 2007/0056171 A1 | 3/2007 | Taryoto | |
| 2007/0107938 A1 * | 5/2007 | Cornish et al. | 175/50 |
| 2007/0114061 A1 | 5/2007 | Hall et al. | |
| 2007/0114062 A1 * | 5/2007 | Hall et al. | 175/50 |
| 2007/0263488 A1 * | 11/2007 | Clark | 367/87 |
| 2009/0057033 A1 * | 3/2009 | Keshavan | 175/432 |
| 2009/0114628 A1 | 5/2009 | DiGiovanni | |
| 2010/0089645 A1 | 4/2010 | Trinh et al. | |
| 2010/0101861 A1 | 4/2010 | Chang | |
| 2010/0118657 A1 * | 5/2010 | Trinh et al. | 367/82 |
| 2010/0155142 A1 * | 6/2010 | Thambynayagam et al. | 175/61 |
| 2010/0307835 A1 * | 12/2010 | Glasgow et al. | 175/327 |
| 2010/0315901 A1 | 12/2010 | Coman et al. | |
| 2010/0319994 A1 | 12/2010 | Wiercigroch | |
| 2010/0322020 A1 | 12/2010 | Kim | |
| 2010/0326731 A1 | 12/2010 | Swietlik et al. | |
| 2011/0139507 A1 * | 6/2011 | Krueger et al. | 175/45 |
| 2011/0168446 A1 | 7/2011 | Lemenager et al. | |
| 2011/0253448 A1 * | 10/2011 | Trinh et al. | 175/50 |
| 2011/0266054 A1 * | 11/2011 | Kumar et al. | 175/39 |
| 2011/0266055 A1 * | 11/2011 | DiGiovanni et al. | 175/50 |
| 2011/0266058 A1 * | 11/2011 | Kumar et al. | 175/57 |
| 2012/0000707 A1 * | 1/2012 | Hall et al. | 175/40 |
| 2012/0024600 A1 * | 2/2012 | Bittar et al. | 175/50 |
| 2012/0037423 A1 * | 2/2012 | Geerits et al. | 175/50 |
| 2012/0080229 A1 * | 4/2012 | Kumar et al. | 175/50 |
| 2012/0103688 A1 * | 5/2012 | Coman et al. | 175/50 |
| 2012/0132468 A1 * | 5/2012 | Scott et al. | 175/50 |
| 2012/0279783 A1 * | 11/2012 | Trinh et al. | 175/50 |
| 2012/0312598 A1 * | 12/2012 | Cheng | 175/50 |
| 2012/0312599 A1 * | 12/2012 | Trinh et al. | 175/57 |
| 2012/0325564 A1 * | 12/2012 | Vaughn et al. | 175/428 |
| 2013/0068525 A1 * | 3/2013 | DiGiovanni | 175/40 |

OTHER PUBLICATIONS

Zhang, X. et al., "Design, Fabrication, and Characterization of Metal Embedded Microphotonic Sensors," Jnl. Manuf. Sci. Eng., vol. 130, No. 3, 031104 (2008).

Cheng, X. et al., "Development of Metal Embedded Microsensors by Diffusion Bonding and Testing in Milling Process," Jnl. Manuf. Sci. Eng., vol. 130, No. 6, 061010 (2008).

* cited by examiner

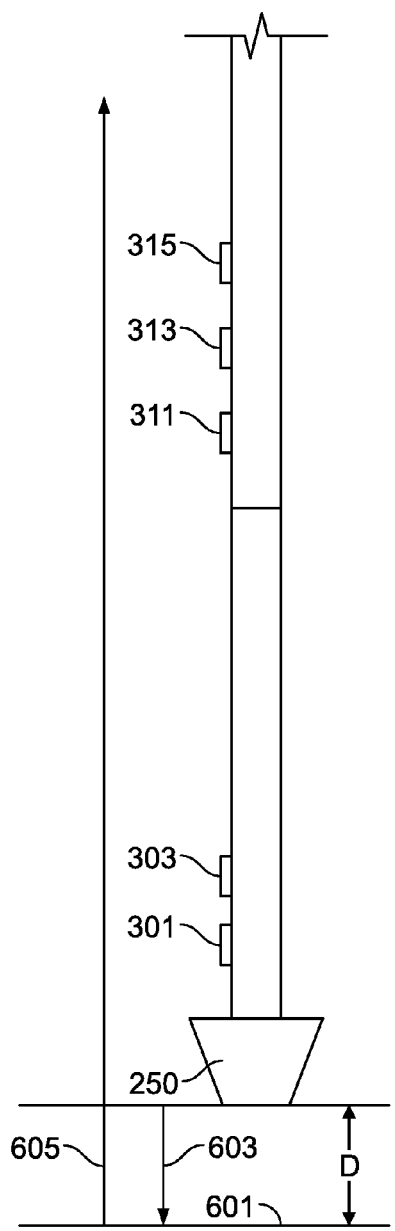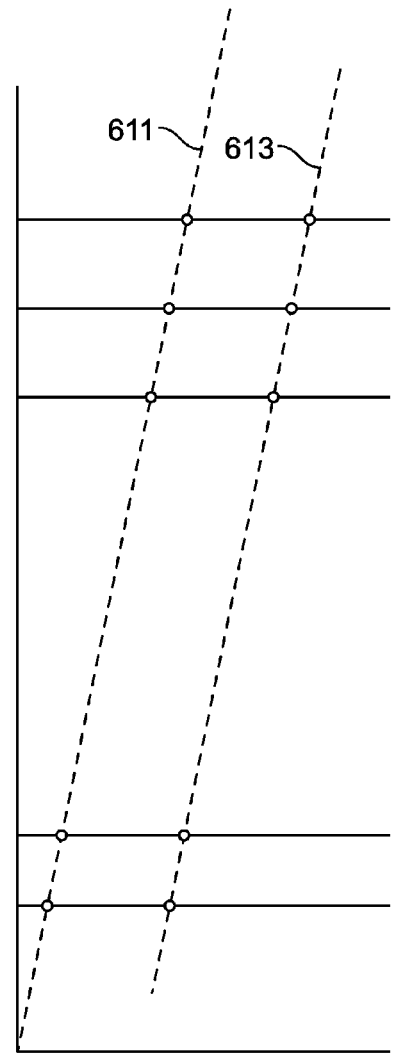
FIG. 6a
FIG. 6b

DRILL-BIT SEISMIC WITH DOWNHOLE SENSORS

CROSS-REFERENCE TO RELATED APPLICATIONS

This application is a continuation in part of U.S. patent application Ser. Nos. 13/093,326 and 13/093,289 filed on Apr. 25, 2011, with priority claims to U.S. provisional patent application Ser. No. 61/408,106 filed on Oct. 29, 2010; a priority claim to U.S. provisional patent application Ser. No. 61/408,144 on Oct. 29, 2010; and a priority claim to U.S. provisional patent application 61/408,119 filed on Oct. 29, 2010.

BACKGROUND OF THE DISCLOSURE

1. Field of the Disclosure

The present disclosure relates to an improved method of determining, while drilling in the earth with a drill bit, the velocity of seismic signals and the positions of geologic formations in the earth. More particularly, it relates to a method for improving the quality of the acquired data.

2. Description of the Related Art

Conventional reflection seismology utilizes surface sources and receivers to detect reflections from subsurface impedance contrasts. The obtained image often suffers in spatial accuracy, resolution and coherence due to the long travel paths between source, reflector, and receiver. In particular, due to the two-way passage of seismic signals through a highly absorptive near surface weathered layer with a low, laterally varying velocity, subsurface images are poor quality. To overcome this difficulty, a technique commonly known as vertical seismic profiling (VSP) was developed to image the subsurface in the vicinity of a borehole. With VSP, a surface seismic source is used and signals are received at a single downhole receiver or an array of downhole receivers. This is repeated for different depths of the receiver (or receiver array).

During drilling operations, the drillstring undergoes continuous vibrations. There are prior art methods and devices in which the drill bit itself is used as a seismic source and processing of signals received at a surface location is used for imaging of reflected signals from the earth formation. There are several major drawbacks with this method. The estimation of the source signal is done at the surface by using a sensor at or near the top of the drillstring, near the swivel. The source signal travels a long way through the drillstring enhanced estimation off the source signal may not be accurate. The present disclosure satisfies this need.

SUMMARY OF THE DISCLOSURE

One embodiment of the disclosure is a method of evaluating an earth formation. The method includes: conveying a bottom hole assembly (BHA) into a borehole and using a drillbit for generating a seismic signal into the formation; receiving signals at least two spaced apart sensors on the BHA responsive to the generated acoustic signal; and using a downhole processor for: processing the received signals at the at least two spaced sensor and estimating the generated seismic signal.

Another embodiment of the disclosure is an apparatus configured to evaluate an earth formation. The apparatus includes: a bottom hole assembly (BHA) configured to be conveyed into a borehole; a drillbit configured to generate a seismic signal into the formation; at least two spaced apart sensors on the BHA responsive to the generated seismic signal; and a downhole processor configured to process the received signals at the at least two spaced sensor and estimate the generated seismic signal Another embodiment of the disclosure is a non-transitory computer-readable medium product having thereon instructions that when read by a processor cause the processor to execute a method. The method comprising: receiving signals at least two spaced apart sensors on a bottomhole assembly (BHA) responsive to a seismic signal generated by a drillbit on the BHA; and processing the received signals at the at least two spaced sensors using an estimate of the generated acoustic signal and estimating a property of the earth formation.

BRIEF DESCRIPTION OF THE DRAWINGS

The present disclosure is best understood with reference to the accompanying figures in which like numerals refer to like elements, and in which:

FIG. 6a shows raypaths used by the arrangement of FIG. 3;

FIG. 6b shows travel times of raypaths from a reflector below the drill bit for the configuration of FIG. 4a;

DETAILED DESCRIPTION OF THE DISCLOSURE

The present disclosure is described with reference to acoustic sensors used in seismic while drilling methodology. However, this is not intended to be a limitation, and the method generally described herein can also be used with other types of sensor measurements.

Figure 1:
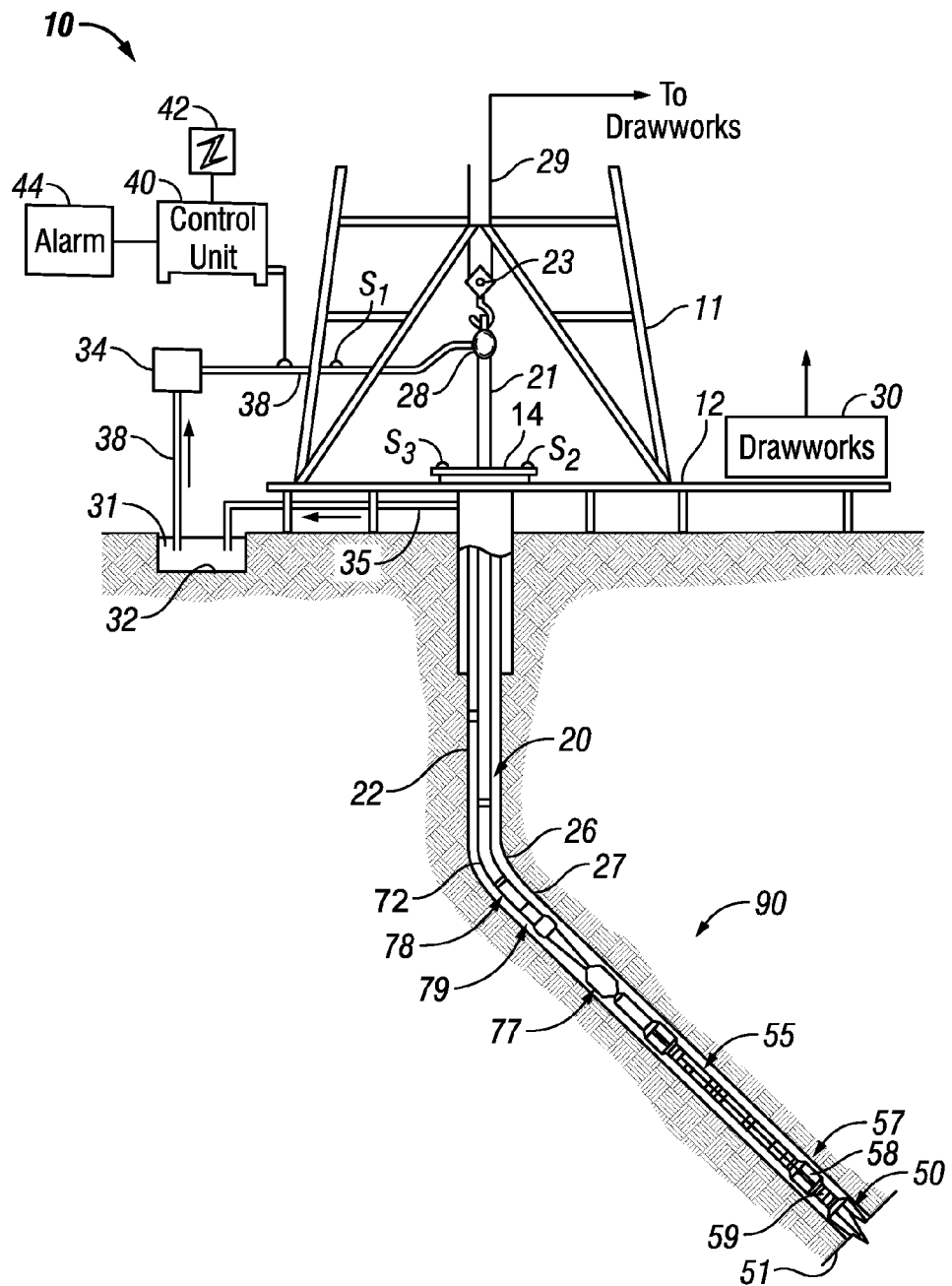
FIG. 1 shows a measurement-while-drilling device suitable for use with the present disclosure.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the borehole. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the borehole 26 when a drill pipe 22 is used as the tubing. For coiled-tubing applications, a tubing injector, such as an injector (not shown), however, is used to move the tubing from a source thereof, such as a reel (not shown), to the borehole 26. The drill bit 50 attached to the end of the drillstring breaks up the geological formations when it is rotated to drill the borehole 26. If a drill pipe 22 is used, the drillstring 20 is coupled to a drawworks 30 via a kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ placed in the line 38 can provide information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters can include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor at a suitable location (not shown) in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 can include a computer or a microprocessor-based processing system, memory for storing programs or models and data, a recorder for recording data, and other peripherals. The control unit 40 can be adapted to activate alarms 44 when certain unsafe or undesirable operating conditions occur.

Figure 2:
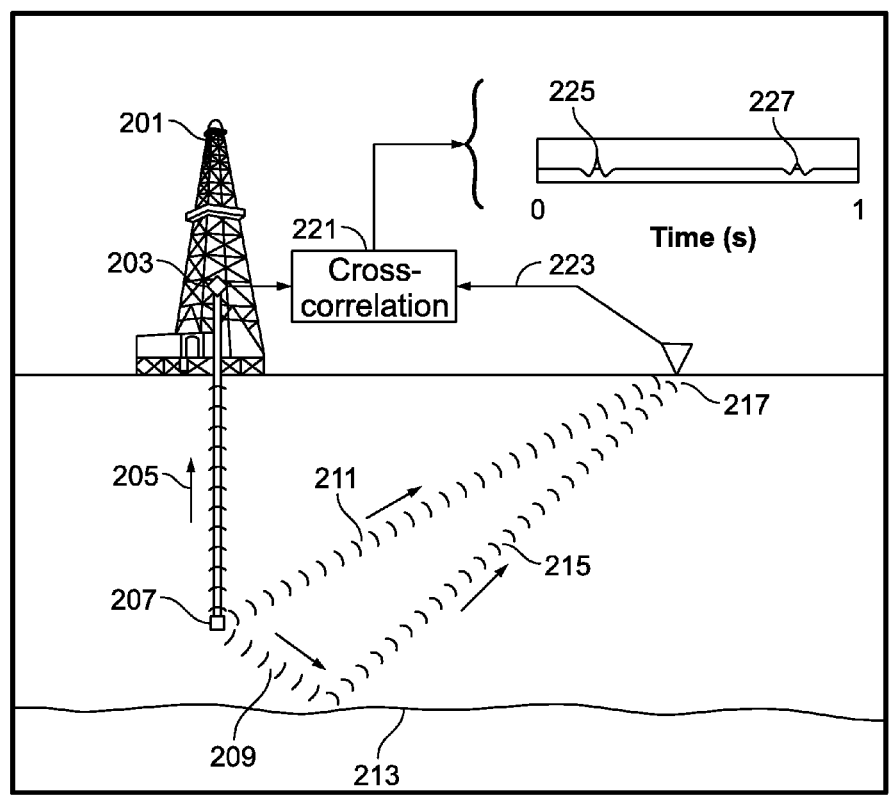
FIG. 2 (prior art) illustrates the arrangement of source and sensors for a method of using a drill bit as a seismic source.

FIG. 2 (prior art) shows an exemplary method of using the drill bit as a seismic source. Shown therein is a rig 201 having a drill bit 207 at the bottom. 205 indicates a signal representative of a seismic wave produced by the drill bit propagating up the drillstring. A direct seismic wave from the drill bit, indicated by 211 is received by an array of receivers denoted by 217. Also shown in FIG. 2 is a seismic wave denoted by 209 that is reflected by an interface 213 and travels as a reflected wave denoted by 215 to the array of receivers 217. A surface processor 221 cross-correlates the output 223 of the array of receivers 217 with a pilot signal measured at the surface by a sensor 203 responsive to the signal 205. The result of the crosscorrelation is a signal in which the direct arrival is shown by 225 and the reflected wave appears as 227.

Figure 3:
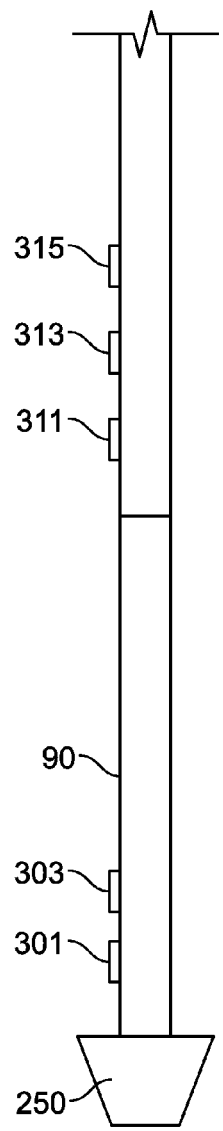
FIG. 3 shows an example of sensor configurations according to one embodiment of the present disclosure.

In one embodiment of the present disclosure, the seismic source and the seismic receivers are both in a downhole position. This is illustrated in FIG. 3. The drill bit 250 on the bottom hole assembly 90 acts as the seismic source. Two proximal detectors 301 and 303 are positioned near the drill bit 250 on the bottom hole assembly. Additional detectors 311, 313, and 315, referred to as distal detectors may be positioned further away from the drill bit 250. The use of these distal detectors is discussed later in this document. It should be noted that the detectors may be hydrophones, geophones or accelerometers. All of these detectors are running on the same or synchronized clocks.

Those versed in the art and having benefit of the present disclosure would recognize that during drilling operations, the acoustic signal produced by the drill bit 250 is by its very nature unpredictable. One purpose of the two proximal detectors 301 and 303 is to produce an estimate of the acoustic signal that is actually generated by the drill string and the velocity of the acoustic signal.

Figure 4:
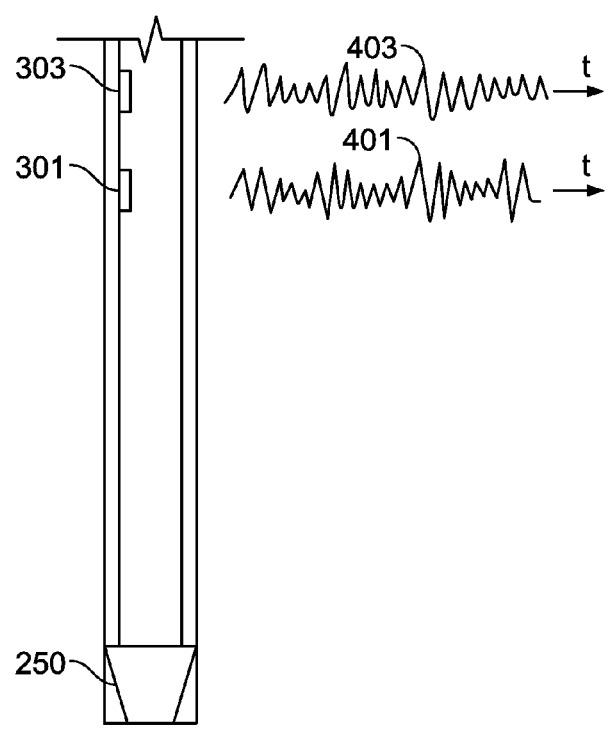
FIG. 4 schematically illustrates signals received at the pool near proximal receivers.
Figure 5:
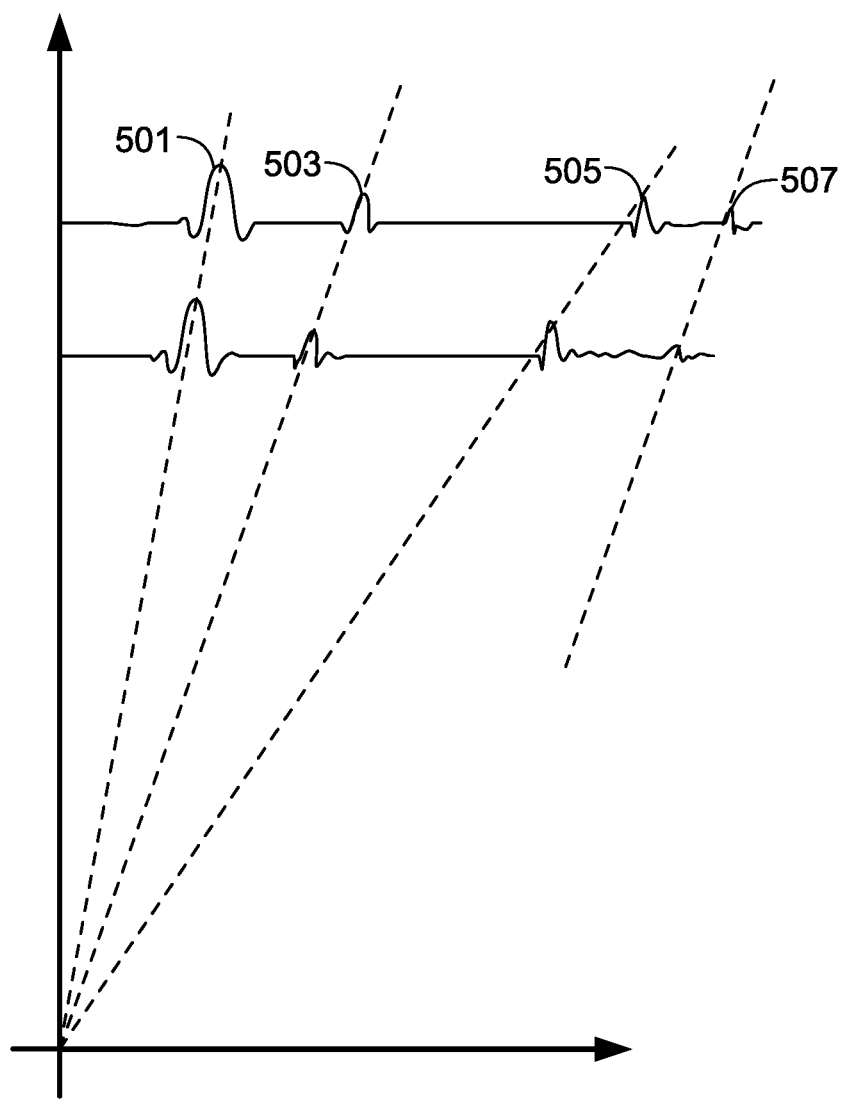
FIG. 5 shows the principal arrivals that are recorded on the two proximal sensors.

Turning now to FIG. 4, exemplary waveforms 403 and 401 of the type that would be recorded at the detectors 303 and 301 are shown. FIG. 5 shows the results of cross correlation of traces 401 and 403 with the actual source wavelet (assuming it is known). The arrivals 501 correspond to a signal propagating directly through the drill pipe/bottom hole assembly. The arrivals 503 correspond to a signal propagating directly through the formation. Such an arrival may be produced because the drillbit may be in direct contact with the formation. The arrivals 505 correspond to a signal propagating through the mud. Finally, the arrivals 507 correspond to a reflection from ahead to the drillbit. Such a reflection may arise if there is a reflecting interface normal to the well trajectory.

Those versed in the art and having benefit of the present disclosure would recognize that the signals 401 and/or 403 may give an unreliable estimate of the source signal. The reason simply is that there are events with different travel time moveouts on the two (or more) traces. In one embodiment of the disclosure, the source signal is estimated by shifting and averaging the recorded signals 401 and 403 using the known velocity of compressional waves in steel. It should be noted that this is likely to be the strongest signal recorded by the receivers.

Processing of the recorded signal may be done at a downhole location. The processing may include a crosscorrelation between the estimated source signal and the recorded signals signals 401 and 403. The result of this crosscorrelation has been discussed above with respect to FIG. 5. The arrivals 503 and 507 give an estimate of the formation compressional wave velocity. During drilling operations, it is thus possible to obtain a continuous estimate of the formation compressional wave velocity as a function of the drilling depth. The use of compressional waves is not to be construed as a limitation: the method may also be used to give an estimate of the formation shear wave velocity when there are detectable sheer arrivals on the traces. It should further be noted that the term "velocity" is intended to include its reciprocal, "slowness".

In one embodiment of the disclosure, the peaks of the correlograms are detected using, for example, a differentiator. The correlogram, or a part of it, may be compressed and transmit it to the surface by mud pulse telemetry.

In one embodiment of the disclosure, the location of an interface ahead of the drill bit may be determined. This is schematically illustrated in FIGS. 6a-6b. An exemplary reflector 601 is shown ahead of the drill bit. An exemplary raypath 603 is reflected at the reflector 601 and travels upward indicated by 605. The time distance relationships of the upcoming direct signal from the drill bit is indicated by 611 while the time distance relationships of the reflected signal 605 is indicated by 613. Again, the use of the distal detectors 311, 313 and 315 is optional. However, the measurements of the time-distance relationship of the direct signal 611 and of the reflected signal 613 can be used to estimate the distance "D" from the drill bit to the reflector 601.

In another embodiment of the disclosure, an array of sensors at the surface, similar to that shown by 217 in FIG. 2 may be used. This makes it possible to image reflectors extending away from the borehole.

Figure 7:
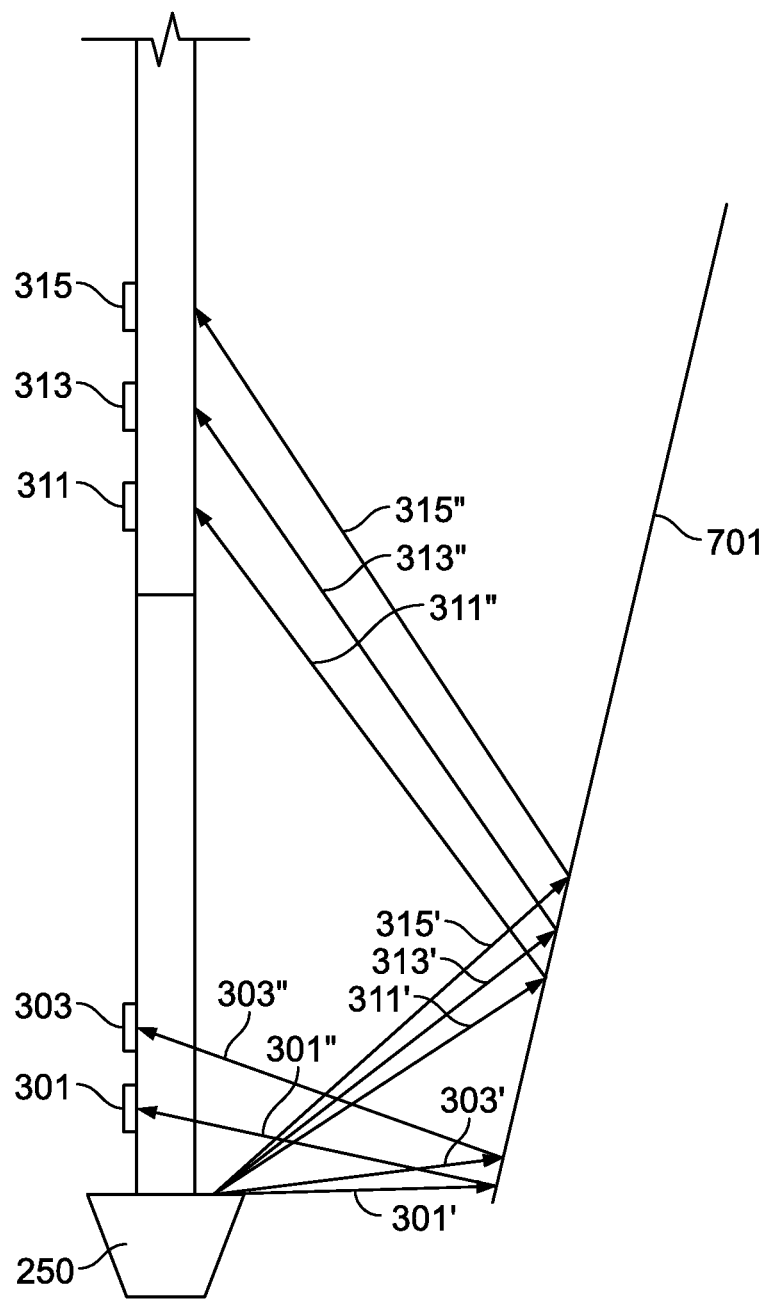
FIG. 7 shows exemplary raypaths of reflections inclined to a wellbore.

Turning now to FIG. 7, one embodiment of the disclosure includes imaging of reflectors inclined to the axis of the borehole. The reflector 701 is shown. Exemplary raypaths 301', 303', 311', 313' and 315' are reflected as reflected rays 301", 303", 311", 313" and 315". Those versed in the art and having benefit of the present disclosure would recognize that the time distance relationship of the reflected arrivals in a homogeneous medium is given by a second order polynomial. Measurements of arrival times at a plurality of detectors makes it possible to estimate the formation velocity as well as the position of the reflector. With an omnidirectional source and an omnidirectional detector, the azimuth of the reflector cannot be determined. However, use of detectors with azimuthally sensitivity makes it possible to resolve the ambiguity in reflector azimuth. The source signal may be sent to the surface during drilling by telemetry such as wired-pipe telemetry. Alternatively, the recorded data may be stored on a downhole memory and recovered after the BHA is tripped to the surface. In yet another embodiment, the image processing may be done downhole and parameters representing the processed image telemetered to the surface.

As a specific example, when the borehole axis is parallel to the reflector, measurements at two different source to receive distances are sufficient to estimate the formation velocity and the distance from the borehole to the interface boundary. In this case, the time distance relationship is given by:

$$T_2 = T_0^2 + \frac{z^2}{V^2}, \qquad (1)$$

Where z is the source-receiver distance and V is the velocity.

Figure 8:
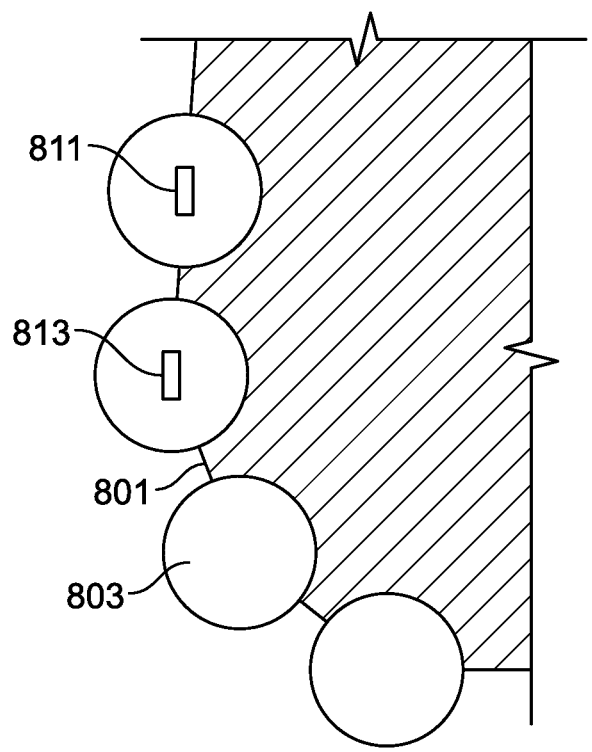
FIG. 8 shows an exemplary source in a polycrystalline diamond compact (PDC) drill bit.

In one embodiment of the disclosure, the drillbit may be provided with a piezoelectric transducer. This is illustrated in FIG. 8 where the matrix 801 of a drillbit is provided with a plurality of Polycrystalline Diamond Compact (PDC) cutting elements 803. One or more of the PDC cutting elements may be fabricated with piezoelectric transducers 811, 813. The transducers provide an acoustic signal in the earth formation having a known shape. As a specific example, the transducers may generate a swept frequency signal (a chirp signal), and cross-correlating the received signals on either the proximal or distant detectors with the source signal is used for detecting the various arrivals discussed above. A particular advantage of using piezoelectric transducer on PDC cutting elements is the ability to generate polarized shear waves. By using appropriate detectors, the shear properties of the earth formation may be determined.

Figure 9:
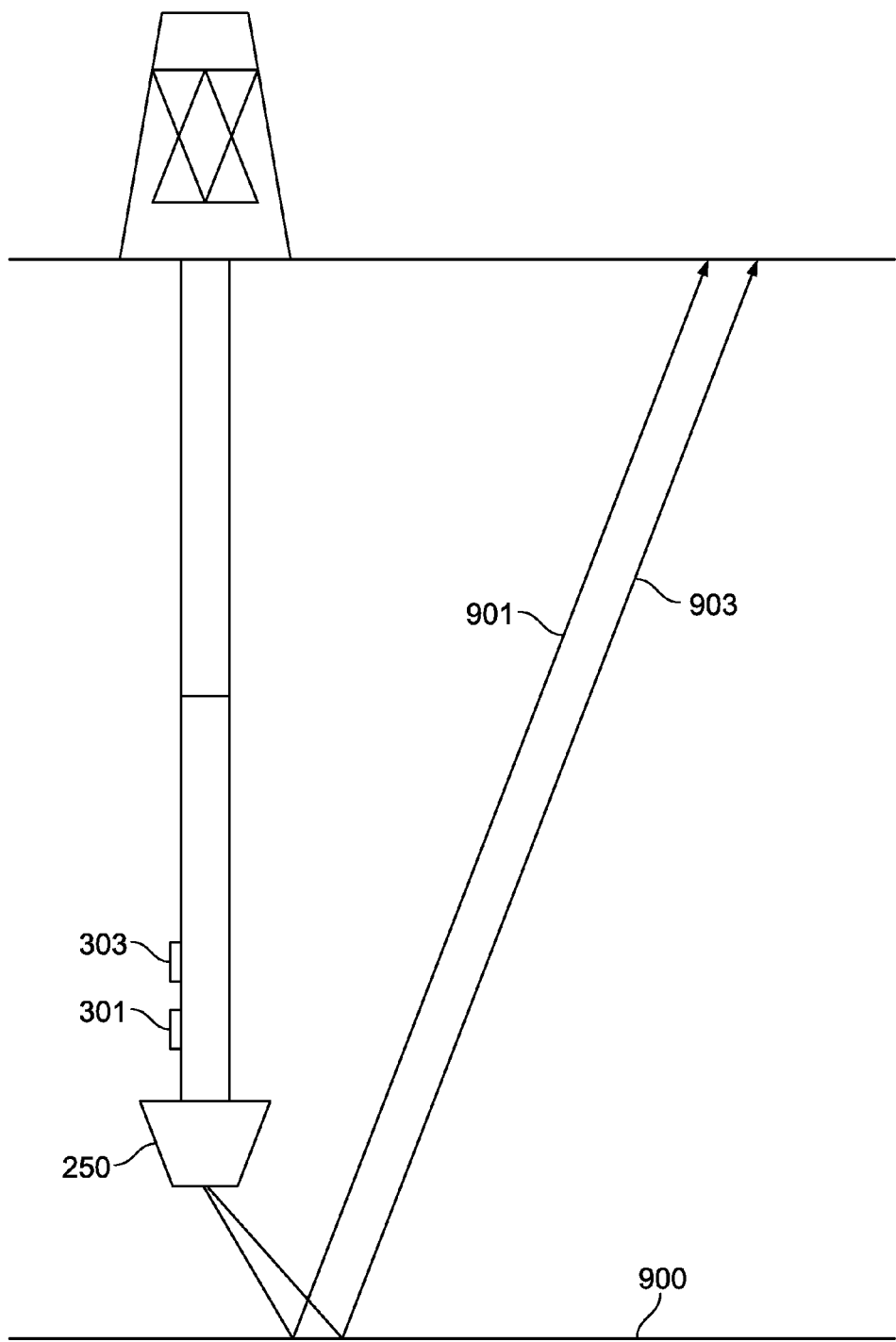
FIG. 9 shows an embodiment of the disclosure in which an array of receivers at the surface is used for imaging the subsurface.

In another embodiment of the disclosure, an array of seismic receivers at the surface is used for processing reflections of seismic signals generated by the drill bit. This is schematically illustrated in FIG. 9. As an example, two receivers 901 and 903 are shown along with to exemplary ray paths reflected from a horizon 900. The received signals at the surface are processed using the estimate of the source signal produced downhole and telemetered to the surface. The telemetering may be done by wired pipe.

The acquisition and processing of measurements made by the transducer may be controlled at least in part by downhole electronics (not shown). Implicit in the control and processing of the data is the use of a computer program on a suitable machine readable-medium that enables the processors to perform the control and processing. The machine-readable medium may include ROMs, EPROMs, EEPROMs, flash memories and optical disks. The term processor is intended to include devices such as a field programmable gate array (FPGA).

While the foregoing disclosure is directed to the specific embodiments of the disclosure, various modifications will be apparent to those skilled in the art. It is intended that all such variations within the scope and spirit of the appended claims be embraced by the foregoing disclosure

What is claimed is:

1. A method of evaluating an earth formation, the method comprising:
   conveying a bottom hole assembly (BHA) into a borehole and using a drillbit for generating an unknown seismic signal into the formation;
   receiving signals at at least two spaced apart sensors on the BHA responsive to the generated seismic signal; and
   using at least one processor for:
      processing the received signals at the at least two spaced apart sensors and estimating the generated seismic signal.

2. The method of claim 1 further comprising using the at least one processor for estimating a property of the earth formation from at least one of: (i) signals received by sensors on the BHA, or (ii) signals received at a surface location.

3. The method of claim 2 further comprising estimating a velocity of a seismic wave.

4. The method of claim 2 wherein the received signals include a reflection from an interface in the earth formation, the method further comprising:
   using the at least one processor for estimating from the received signals a position of the interface.

5. The method of claim 4 further comprising controlling a drilling operation using the estimated position of the interface.

6. The method of claim 1 further comprising using the at least one processor for producing the estimate of the generated seismic signal by shifting and averaging the received signal at a first one of the at least two spaced apart sensors with the received signal at a second one of the at least two spaced apart sensors.

7. The method of claim 1 further comprising using a piezoelectric transducer on a polycrystalline diamond compact cutting element on the drillbit for producing the generated seismic signal.

8. The method of claim 1 wherein estimating the generated seismic signal further comprises performing a crosscorrelation.

9. The method of claim 1 further comprising telemetering the estimate of the generated seismic signal to a surface location.

10. An apparatus configured to evaluate earth formation, the apparatus comprising:
 a bottom hole assembly (BHA) configured to be conveyed into a borehole;
 a drillbit configured to generate an unknown seismic signal into the formation;
 at least two spaced apart sensors on the BHA responsive to the generated seismic signal; and
 at least one processor configured to process the received signals at the at least two spaced apart sensors and estimate the generated seismic signal.

11. The apparatus of claim 10 wherein the at least one processor comprises a processor selected from: (a) a downhole processor configured to estimate a property of the earth formation from at least one of: (i) signals received by sensors on the BHA, or (ii) signals received at a surface location, and (b) a surface processor configured to estimate a property of the earth formation from at least one of: (i) signals received by sensors on the BHA, or (ii) signals received at a surface location.

12. The apparatus of claim 10 further comprising using the at least one processor for estimating a velocity of a seismic wave in the earth formation.

13. The apparatus of claim 10 wherein the at least one processor is further configured to produce the estimate of the generated seismic signal by shifting and averaging the received signal at a first one of the at least two spaced apart sensors with the received signal at a second one of the at least two spaced apart sensor.

14. The apparatus of claim 10 further comprising a piezoelectric transducer on a polycrystalline diamond compact cutting element on the drillbit configured to produce the generated seismic signal.

15. The apparatus of claim 10 wherein estimating the generated seismic signal further comprises performing a cross-correlation.

16. The apparatus of claim 10 wherein the at least one processor is further configured to telemeter the estimate of the generated seismic signal to a surface location.

17. The apparatus of claim 10 wherein the received signals include a reflection from an interface in the earth formation, and wherein the at least one processor is further configured to estimate, from the received signals a position of the interface.

18. The apparatus of claim 10 wherein the at least one processor is further configured to control a drilling operation using the estimated position of the interface.

19. The apparatus of claim 10 wherein the bottom hole assembly is configured to be conveyed into the borehole using a drilling tubular.

20. A non-transitory computer-readable medium product having thereon instructions that when read by at least one processor cause the at least one processor to execute a method, the method comprising:
 receiving signals at at least two spaced apart sensors on a bottomhole assembly (BHA) responsive to an unknown seismic signal generated by a drillbit on the BHA; and
 processing the received signals at the at least two spaced sensors using an estimate of the generated seismic signal and estimating a property of the earth formation.

* * * * *